(12) United States Patent
Starr et al.

(10) Patent No.: US 10,783,653 B2
(45) Date of Patent: Sep. 22, 2020

(54) METHOD FOR DETERMINING A GEOMETRIC PARAMETER OF A TRAILER OF A VEHICLE/TRAILER COMBINATION WITH A MOTOR VEHICLE AND THE TRAILER, DETECTION SYSTEM, DRIVER ASSISTANCE SYSTEM AND MOTOR VEHICLE

(71) Applicant: Connaught Electronics Ltd., Tuam, County Galway (IE)

(72) Inventors: Michael Starr, Tuam (IE); George Siogkas, Tuam (IE)

(73) Assignee: Connaught Electronics Ltd., Tuam, County Galway (IE)

( * ) Notice: Subject to any disclaimer, the term of this patent is extended or adjusted under 35 U.S.C. 154(b) by 64 days.

(21) Appl. No.: 16/321,672

(22) PCT Filed: Jul. 24, 2017

(86) PCT No.: PCT/EP2017/068569
§ 371 (c)(1),
(2) Date: Jan. 29, 2019

(87) PCT Pub. No.: WO2018/019745
PCT Pub. Date: Feb. 1, 2018

(65) Prior Publication Data
US 2020/0090360 A1  Mar. 19, 2020

(30) Foreign Application Priority Data
Jul. 29, 2016 (DE) .................. 10 2016 114 060

(51) Int. Cl.
*G06T 7/60* (2017.01)
*G06T 7/55* (2017.01)
*B60R 1/00* (2006.01)

(52) U.S. Cl.
CPC .................. *G06T 7/60* (2013.01); *B60R 1/00* (2013.01); *G06T 7/55* (2017.01); *B60R 2300/30* (2013.01);
(Continued)

(58) Field of Classification Search
CPC .... B62D 13/00–13/06; G06K 2209/23; B60W 2520/22;
(Continued)

(56) References Cited

U.S. PATENT DOCUMENTS

2017/0300761 A1* 10/2017 Chaney, Jr. ............... G06T 7/62
2018/0045823 A1*  2/2018 Prasad .................... G01S 13/42

FOREIGN PATENT DOCUMENTS

DE         10326190 A1   12/2004
DE    102004022113 A1   11/2005
(Continued)

OTHER PUBLICATIONS

C. Fuchs et al., "3D Pose Estimation for Articulated Vehicles Using Kalman-Filter Based Tracking", ISSN 1054-6618, Pattern Recognition and Image Analysis, 2016, vol. 26, No. 1, pp. 109-113, copyright Pleiades Publishing, Ltd., 2016, pp. 109-113. (Year: 2016).*

(Continued)

*Primary Examiner* — Brian Werner
(74) *Attorney, Agent, or Firm* — Osha Liang LLP

(57) ABSTRACT

It is the object of the present invention to demonstrate a simple method for determining a geometric parameter (H, B, L, R, F) of a trailer (3) of a vehicle/trailer combination (7) with a motor vehicle (1) and the trailer (3). The invention relates to a method for determining at least one geometric parameter (H, B, L, R, F) of a trailer (3) of a vehicle/trailer combination (7) with a motor vehicle (1) and the trailer (3), in which the trailer (3) is captured by at least one detector
(Continued)

Figure 3:
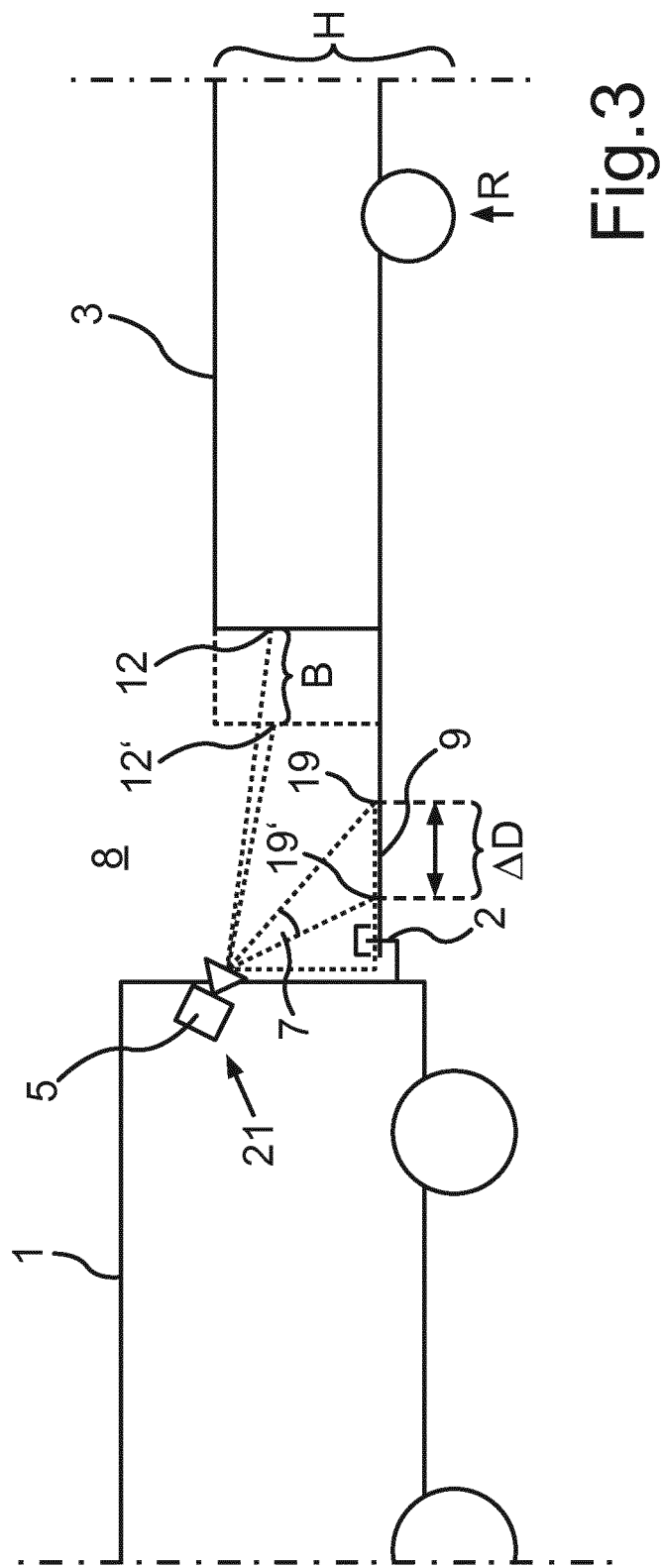

unit (5) disposed at the motor vehicle (1) and the geometric parameter (H, B, L, R, F) is determined depending thereon, wherein in the state of the trailer (3) attached to the motor vehicle (1), at least one characteristic location (12) of the trailer (3) is captured in a first operating state of a functional unit (9) of the trailer (3) by a detector unit (5) of the motor vehicle (1), and in a state of the trailer (3) attached to the motor vehicle (1), at least the characteristic location (12) of the trailer (3) in a second operating state of the functional unit (9) of the trailer (3) different from the first operating state is captured by a detector unit of the motor vehicle (1), and depending on the information of the characteristic location (12) obtained in the two operating states of the functional unit (9), the geometric parameter (H, B, L, R, F) of the trailer (3) is determined.

14 Claims, 4 Drawing Sheets

(52) U.S. Cl.
CPC ............... *B60R 2300/8086* (2013.01); *G06T 2207/30252* (2013.01)

(58) Field of Classification Search
CPC ................. B60W 2300/14–2300/145; G01S 2013/93272; G01B 21/06; G06T 7/55; G06T 2207/10028; G06T 2207/10012; G06T 7/593–7/596; G06T 2200/04
See application file for complete search history.

(56) References Cited

FOREIGN PATENT DOCUMENTS

| | | | |
|---|---|---|---|
| DE | 102004050149 | A1 | 4/2006 |
| DE | 102006056408 | A1 | 6/2008 |
| DE | 102014107917 | A1 | 9/2015 |
| DE | 102015009658 | A1 | 3/2016 |
| WO | 2015001065 | A1 | 1/2015 |

OTHER PUBLICATIONS

International Search Report and Written Opinion Issued in Corresponding PCT Application No. PCT/EP2017/068569, dated Nov. 7, 2011 (10 Pages).
"Structure from Forward Motion", Frederik Svensson, Dated Oct. 4, 2010, URL:http://www.diva-portal.org/smash/get/diva2:355971/FULLTEXT03.PDF (58 Pages).
German Search Report Issued in Corresponding German Application No. 102016114060.0, dated Jun. 7, 2017 (5 Pages).

* cited by examiner

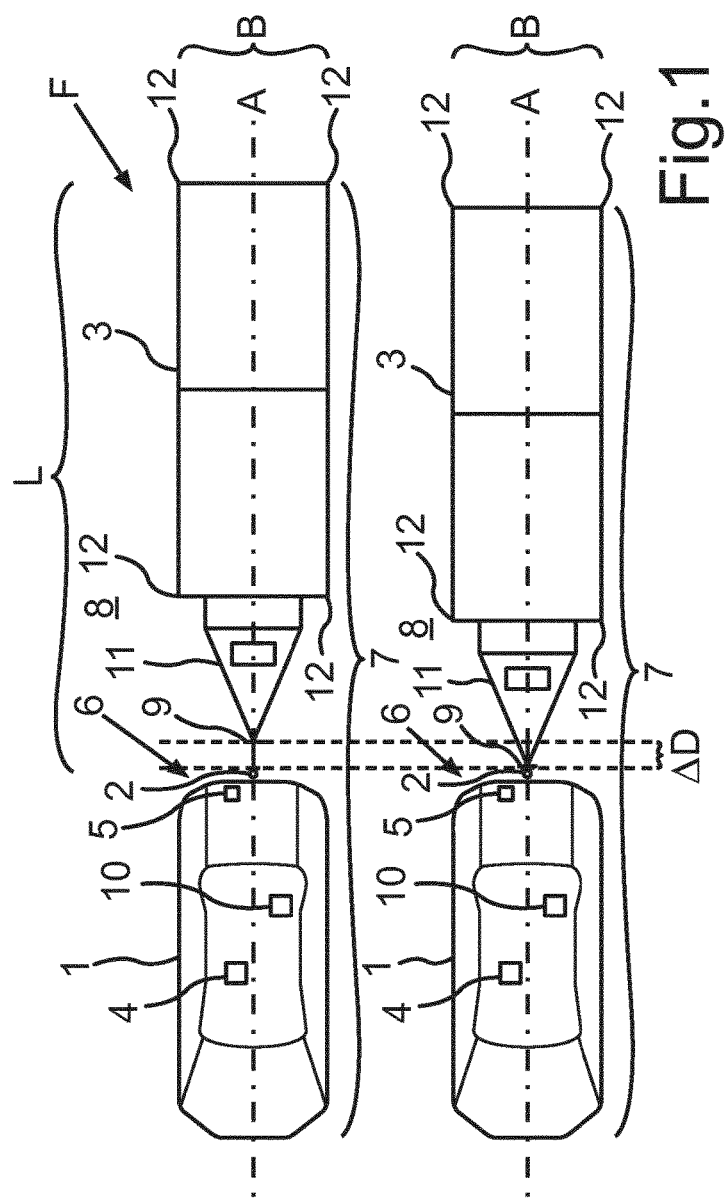
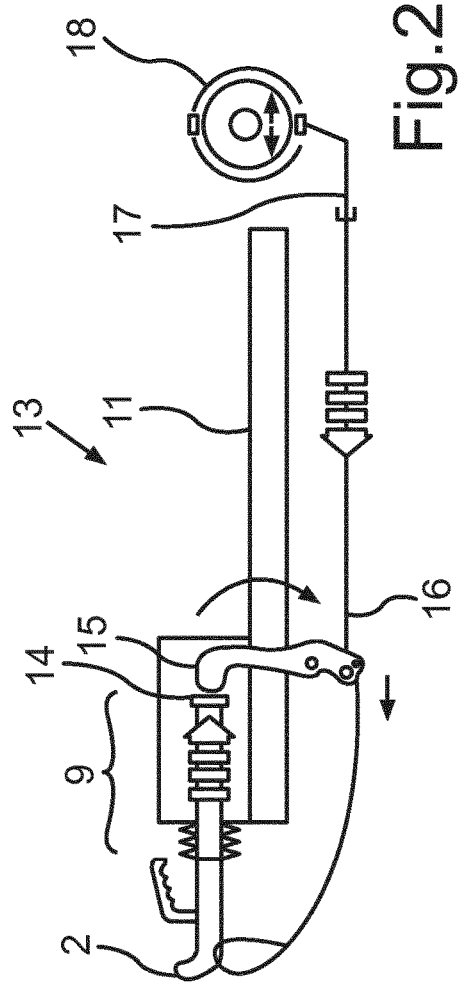

METHOD FOR DETERMINING A GEOMETRIC PARAMETER OF A TRAILER OF A VEHICLE/TRAILER COMBINATION WITH A MOTOR VEHICLE AND THE TRAILER, DETECTION SYSTEM, DRIVER ASSISTANCE SYSTEM AND MOTOR VEHICLE

The invention relates to a method for determining at least one geometric parameter of a trailer of a vehicle/trailer combination with a motor vehicle and the trailer, in which the trailer is captured by at least one detector unit disposed at the motor vehicle and the geometric parameter is determined depending thereon. Furthermore, the invention relates to a detection system for determining a geometric parameter of a trailer of a vehicle/trailer combination with a motor vehicle and the trailer including a detector unit disposed in the motor vehicle, which captures the trailer and determines the geometric parameters depending thereon. Further, the invention relates to a driver assistance system with the sensor system as well as to a motor vehicle with the driver assistance system.

From WO 2015/001065 A1, a system for identifying trailer parameters is already known. The system for identifying at least one trailer parameter, in particular a geometric parameter of the trailer, includes at least one sensor and a processor. The sensor is adapted to collect data. The processor is adapted to process the data and to determine the geometric parameter of the trailer therefrom. Hereto, the trailer has to be detached from the motor vehicle and the motor vehicle has to pass by the trailer, wherein the at least one sensor is disposed at the motor vehicle. During the passage, the sensor records the corresponding data of the trailer, from which the geometric parameter is later determined. This is very expensive and prone to error.

It is the object of the present invention to further develop a method for determining at least one geometric parameter of a trailer of a vehicle/trailer combination with a motor vehicle and the trailer of the initially mentioned kind such that the at least one geometric parameter of the trailer can be more simply determined.

This object is solved by a method, a detection system and a motor vehicle according to the independent claims.

In a method according to the invention, at least one geometric parameter of a trailer of a vehicle/trailer combination with a motor vehicle and the trailer, the trailer is captured by at least one detector unit disposed at the motor vehicle and the geometric parameter is determined independently thereof. An essential idea is to be regarded in that in the state of the trailer attached to the motor vehicle, at least one location of the trailer characterizing the trailer is captured in a first operating state of a functional unit of the trailer by a detector unit of the motor vehicle, and the location of the trailer characterizing the trailer in the state of the trailer attached to the motor vehicle is captured in a second operating state of the functional unit of the trailer different from the first operating state by a detector unit of the motor vehicle, and depending on the information of the characteristic location obtained in the two operating states of the functional unit, the geometric parameter of the trailer is determined. Thus, the at least one geometric parameter can be more simply and exactly determined.

The characteristic location of the trailer can for example be an edge of the trailer, which belongs to the construction of the trailer. Furthermore, a wheel case, a corner of the trailer, a window or similar characteristic locations of the trailer can be the characteristic location, which in particular optically and/or geometrically characterize the trailer. By means of this method, thus, in the attached state, in particular then also during travel of the vehicle/trailer combination, the at least one geometric parameter can be determined. This has the advantage that the trailer is only attached to the motor vehicle and the vehicle/trailer combination begins to move. Thus, the geometric parameter can also be determined during travel. Thus, the motor vehicle driver does not have to pass by a standing trailer to obtain the geometric parameter. A detector unit can be a single one, or at least two different detector units can be present, with multiple detector units, they can also be functionally different, wherein here reference is for example made to the already above mentioned examples. A detector unit can for example be an ultrasonic sensor, lidar sensor, radar sensor or a camera.

According to an advantageous configuration mode of the method according to the invention, the first and the second operating state can be recognized from two different images captured by the at least one camera. By means of the camera, images can be captured in simple manner. A plurality of detection methods can be available for the camera such that the first and the second operating state can be simply and securely recognized.

In particular, the functional unit is formed variable in length. Thereby, a first length or extension of the functional unit along a longitudinal axis of the trailer results as the first operating state and a second length or extension different therefrom in this direction of the longitudinal axis of the trailer results as the second operating state. In particular, the functional unit is an overrun brake of the trailer. As a first operating state of this overrun brake, a longer relaxed state is preset, and a shorter tensioned state is preset as a second operating state of this overrun brake.

According to an advantageous configuration of the method, the characteristic location of the trailer and the first operating state of the functional unit can be captured in a first image, and the characteristic location of the trailer and the second operating state of the functional unit can be captured in a second image. Thus, the characteristic location and the operating states of the functional unit can be captured by means of only one camera. Both the characteristic location of the trailer and the operating states of the functional unit can be captured in simple and component saving manner.

In a further configuration mode, a tensioned state of a functional unit formed as an overrun brake of the trailer can be captured as the first operating state and a tensioned state of this overrun brake can be captured as the second operating state. The overrun brake is a device, by which the trailer itself can be braked. Its functionality is in that if the motor vehicle is braked, the trailer runs on the motor vehicle and the overrun brake is then active. This force is transmitted from a tow coupling via a mechanic lever to brakes of the trailer. The braking force depends on how severely the towing motor vehicle decelerates. However, compared to the non-braked trailer, the pushing effect of the trailer is lower and automatically adjusts itself via the brake deceleration. In a braking operation, thus, the two different operating states of the overrun brake can be used to capture the corresponding state change via the detector unit. The use of the overrun brake as the functional unit has the advantage that the overrun brake is already disposed at many trailers such that an additional component is not required to capture the operating states of the functional unit.

In a further advantageous configuration mode, a displaceable element of the overrun brake can be disposed in a drawbar of the trailer, wherein the displaceable element is positioned extracted in a relaxed state of the overrun brake and thereby a first extension length of the overrun brake is generated in the area of the drawbar, and the displaceable element is positioned retracted in a tensioned state of the overrun brake, and thereby a second extension length of the overrun brake shortened with respect to the first extension length is generated in the area of the drawbar, and the extension lengths are captured and the operating state of the overrun brake is recognized depending thereon. The extension length or the displaceable element can be very exactly recognized by means of the detector unit, and thus conclusion concerning the operating state of the functional unit can be drawn. The displacement of the overrun brake, in particular of the tow bar of the overrun brake, can therefore be captured by the detector unit and converted to real measuring units such as for example millimeters, centimeters or meters by means of an evaluation device coupled to the detector unit. Thus, an exact reference system to the remaining trailer can be realized by means of the tow bar, which in turn can be used for determining the at least one geometric parameter.

A geometric parameter could be any geometric parameter relating to any part of the trailer visible from any of the cameras on the vehicle.

According to a further advantageous configuration mode of the method, for example a height, a length, a width, a tire number or a shape of the trailer can be determined as the geometric parameter of the trailer. Further, a geometric parameter of the trailer could also be a characterizing parameter of a wheel of the trailer, like a wheel dimension, a tire width or a wheel radius Thus, the geometric shape or important parameters characterizing the trailer also concerning type can be determined in advantageous manner and in very simple manner. Conclusion can be drawn via the at least one geometric parameter, which can be of interest for the motor vehicle driver, since a travel route can for example be impaired thereby.

According to a further advantageous configuration mode, a plurality of geometric parameters of the trailer can be determined and an at least two-dimensional model of the trailer can be created depending on the geometric parameters. It is also possible that a three-dimensional model of the trailer is determined due to the plurality of geometric parameters of the trailer. The at least two-dimensional model can for example be presented by means of the evaluation device, which can be disposed in the motor vehicle, such that the motor vehicle driver has available a model for example on a screen after attaching a trailer and thus can draw corresponding conclusions concerning the trailer.

In a further advantageous configuration mode of the method, an angle of a longitudinal axis of the trailer to a longitudinal axis of the motor vehicle can be captured in the respective capture of the operating state of the functional unit and at least one of these angles and/or an angular change can be taken into account in determining the characteristic location in the respective captures of the operating states of the functional unit. Thus, it can be ensured that the at least one geometric parameter can be securely calculated even upon angular change, which can in particular occur in cornering of the vehicle/trailer combination, and thus incorrect data or information of the trailer cannot be sent to the motor vehicle driver. Furthermore, it is possible that the first operating state is captured at a first angle between a drawbar of the trailer and a longitudinal axis of the motor vehicle and the second operating state is captured at a second angle different from the first angle between the drawbar of the trailer and the longitudinal axis of the motor vehicle. Conclusions concerning the trailer or the geometric parameters of the trailer can also be drawn without functional unit, in particular without overrun brake, only based on the angular change for example of the drawbar to the longitudinal axis of the motor vehicle. Thus, the angular change serves as a basis to determine the corresponding geometric parameter. This has the advantage that trailers without overrun brake can also be determined in very simple manner by means of the method.

It is further advantageous that the at least one geometric parameter of the trailer is determined by triangulation considering the characteristic location of the trailer in the respective operating states of the functional unit and/or the geometric position of the functional units to the motor vehicle and/or operating states of the functional units representing to the characteristic location. In the triangulation, it is assumed that a point x in a three-dimensional space is visible in at least two images. By means of the evaluation device, camera matrices for the first and the second image can be created. The point x can be located at a first place in the first image and at a second place in the second image. For the triangulation, the operating state of the functional unit is also required, in which in particular the movement, in particular a translational movement is known. Based on the known movement of the functional unit, the characteristic location or therefrom the geometric parameter of the trailer can now be calculated by means of the triangulation. During travel of the vehicle/trailer combination, for example in braking or in accelerating the motor vehicle, the geometric parameter can be very simply determined in advantageous manner. The triangulation algorithms are sufficiently known and can be provided in the evaluation device in simple manner.

According to a further advantageous configuration mode, by means of a feature detection algorithm, for example a so-called "computer vision" algorithm, which has a functional matrix, the first and the second operating state and the information of the characteristic location can be captured. The feature detection, is an already established method such that it can be very simply used for the detection, in particular of the characteristic location, or for the detection of the operating state of the functional unit. Hereto, each pixel of an image is examined and it is checked if a feature is located there. For the feature detection, diverse algorithms are already known, whereby in particular edges, corners, ridges or other characteristic locations can be detected. A plurality of feature detection algorithms can be advantageously employed, wherein the characteristic location of the trailer or the operating state of the functional unit can be very securely recognized.

According to a further advantageous configuration mode of the method, a further travel route of the vehicle/trailer combination to a destination can be determined depending on the geometric parameter, in particular the model of the trailer. The evaluation device can for example be coupled to a navigation system, in which a corresponding travel route is determined due to the geometric parameter, in particular the two-dimensional or three-dimensional model of the trailer. For example, curve radii can be determined with a certain length of the trailer, which are not passable by the vehicle/trailer combination anymore, and thus an alternative route can be determined by means of the navigation system. Thus, the motor vehicle driver can be very comfortably get displayed the new travel route in the attached state and correspondingly fall back on the new travel route such that it can be ensured that the vehicle/trailer combination also can use this travel route, which does not have too narrow curve radii. Thus, time can be advantageously saved since a correct travel route for the vehicle/trailer combination can be determined from the start.

A detection system also belongs to the method according to the invention, in particular a sensor system, for calculating a geometric parameter of a trailer of a vehicle/trailer combination with a motor vehicle and the trailer including a detector unit disposed at the motor vehicle, which captures the trailer and determines the geometric parameters depending thereon. A detector unit captures at least one location of the trailer characterizing the trailer in a first operating state of a functional unit of the trailer in a state of the trailer attached to the motor vehicle. A detector further captures at least the location of the trailer characterizing the trailer in a second operating state of the functional unit of the trailer different from the first operating state in a state of the trailer attached to the motor vehicle. The geometric parameter of the trailer is determined depending on the information of the characteristic location of the trailer obtained in the two operating states of the functional unit. The detector units can be identical and be realized as one detector unit, or they can be separate detector units.

Furthermore, the invention relates to a driver assistance system with the detection system.

Further, the invention relates to a motor vehicle with a driver assistance system.

Advantageous configurations of the method are to be considered as advantageous configurations of the detection system and of the driver assistance system according to the invention, respectively, and of the motor vehicle according to the invention, wherein one or more detector units are formed for performing the method steps thereto.

With indications of "at the bottom", "at the rear", "at the top", "below", vehicle longitudinal axis", "lateral", etc., the positions and orientations given with an observer sitting in an interior of the motor vehicle and looking in the direction of a vehicle longitudinal axis are specified.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not have all of the features of an originally formulated independent claim. Moreover, implementations and feature combinations are to be considered as disclosed, in particular by the implementations set out above, which extend beyond or deviate from the feature combinations set out in the relations of the claims.

Below, embodiments are explained in more detail based on schematic drawings.

Figure 4:
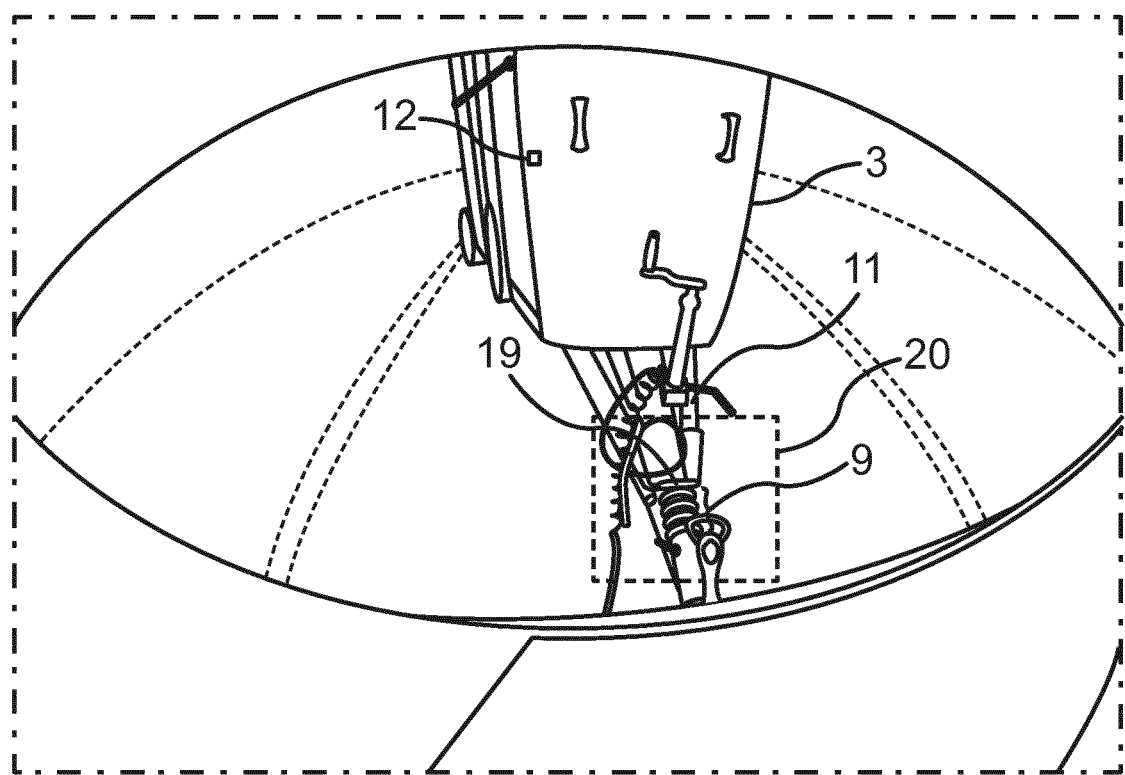
Figure 5:
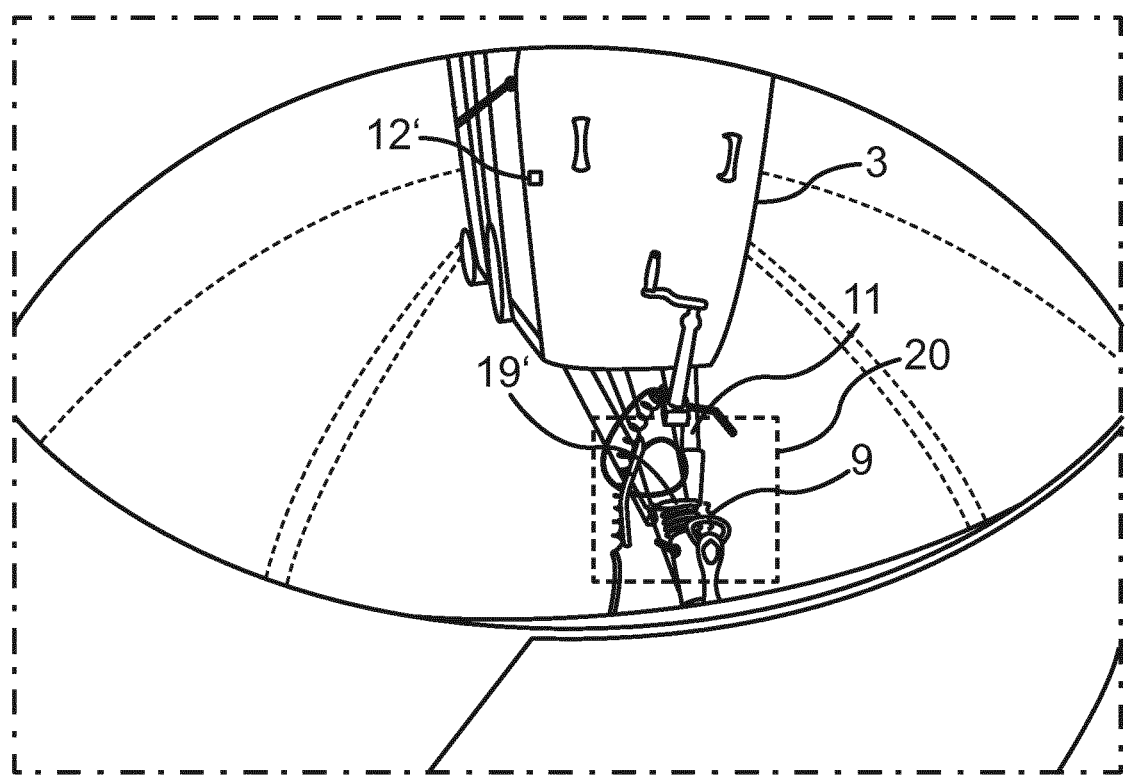

There show:

FIG. 1 a schematic perspective view of an embodiment of a vehicle/trailer combination according to the invention in a first and a second operating state;

FIG. 2 a schematic cross-sectional view of an overrun brake;

FIG. 3 a schematic perspective view of an embodiment of the vehicle/trailer combination;

FIG. 4 a schematic image section of a camera of the vehicle/trailer combination of a first operating state of the overrun brake; and FIG. 5 a further schematic image section of the camera of the vehicle/trailer combination of a second operating state of the overrun brake.

In the figures, identical as well as functionally identical elements are provided with the same reference characters.

FIG. 1 shows a motor vehicle 1 with a tow coupling 2 and a trailer 3 according to an embodiment of the invention. The trailer 3 is coupled, in particular attached, to the motor vehicle 1 via the tow coupling 2. Thereby, a vehicle/trailer combination 7 is formed. The trailer 3 can for example be formed as a caravan or a horse trailer. Therein, the trailer 3 can have a plurality of geometric parameters H, B, L, R, F. Therein, the geometric parameters H, B, L, R, F can be a height H, a width B, a length L, a tire number R and/or a shape F of the trailer 3. The motor vehicle 1 further includes a driver assistance system 4, which is adapted to determine information, in particular a two-dimensional or three-dimensional model of the trailer 3, and in particular to display it on a display device to the driver of the motor vehicle 1. Furthermore, the driver assistance system 4 can in particular be coupled to a navigation system such that a travel route is for example proposed to the driver of the motor vehicle 1 via the driver assistance system 4.

The driver assistance system 4 has at least one camera 5 detecting rearwards viewed along the longitudinal axis A and thus in the direction of the trailer 3 as the detector unit. Therein, the camera 5 is for example formed as a rear camera and is located in a rear area 6 of the motor vehicle 1. The motor vehicle 1 with the trailer 3 forms a vehicle/trailer combination 7. The camera 5 captures an environmental region 8 of the motor vehicle 1 behind the motor vehicle 1 in images (see FIG. 4 and FIG. 5). Therein, the images captured by the rearward looking camera 5 in particular also show the trailer 3 in certain areas.

In addition, the driver assistance system 4 has an evaluation device 10, which can for example be formed by a vehicle-side control unit. The evaluation device 10 serves for processing the images of the environmental region 8 captured by the camera 5 and for example transmitting them to the driver assistance system 4. Thereto, the driver assistance system 4 can have a display device, which can for example be disposed in an interior of the motor vehicle 1. This can for example be a screen in a dashboard of the motor vehicle 1. Therein, the images captured by the camera 5 or a two-dimensional or a three-dimensional model of the trailer 3 can be represented.

In particular, the evaluation device 10 can communicate with the camera 5 such that a triangulation algorithm or a feature detection algorithm can for example be provided by the evaluation device 10. In particular, the camera 5 can be oriented to a functional unit 9 such that the camera 5 can capture a change of the operating state of the functional unit 9. In the embodiment, the functional unit 9 is a brake device, in particular an overrun brake 13 of the trailer 3. The functional unit 9 is in particular also disposed at a drawbar 11, in particular in a front area of the drawbar 11 of the trailer 3 viewed along the vehicle longitudinal axis A with some components. The drawbar 11 is also in a front area of the trailer 3 at least in certain areas. Here, the functional unit 9 is in an extracted, in particular in a decompressed and thus in a relaxed state, which corresponds to the first operating state in the embodiment. Furthermore, the trailer 3 has at least one characteristic location 12, 12'. The characteristic location 12, 12' can for example be a front edge of the trailer or a rear edge of the trailer, and other characteristic locations 12, 12' of the trailer are also possible such as for example a wheel arch or the like.

In the state illustrated in FIG. 1 at the bottom, the functional unit 9 is in a second operating state. In particular, the second operating state can for example be represented in braking the vehicle/trailer combination 7 by the motor vehicle 1. Herein, the functional unit 9 has shortened along the longitudinal axis A. The shortening is in particular a distance change ΔD, wherein the distance change ΔD is to be regarded only as a possible distance change ΔD in this embodiment. Thus, the trailer 3 has approached the motor vehicle 1.

The rearward detecting camera 5 can in particular capture a second image of the trailer 3 in the second operating state of the functional unit 9, wherein both the functional unit 9 and the characteristic location 12, 12' of the trailer 3 are captured in the first and the second image. The evaluation device 10 can in particular recognize and determine the distance change ΔD of the functional unit 9 in the first image to the second image by means of the triangulation algorithm. By means of the feature detection of the evaluation device 10, the characteristic location 12, 12' of the trailer 3 can also be recognized. Besides the distance change ΔD of the functional unit, a distance change ΔD of the characteristic location 12, 12' also has arisen. By means of the triangulation of the evaluation device 10, now, the distance change ΔD of the characteristic location 12 can also be determined based on the calculated distance change ΔD and therefrom conclusions concerning for example the height H, the width B or also other geometric parameters H, B, L, R, F of the trailer 3 can be drawn or the geometric parameters H, B, L, R, F of the trailer 3 can be determined by means of the triangulation via the evaluation device 10 or by means of the driver assistance system 4. This is effected by evaluation of the pixel changes from the first to the second image of the characteristic location 12, 12'.

In the vehicle/trailer combination 7 illustrated in FIG. 1, the vehicle/trailer combination 7 is in a moved state such that a deceleration can for example result in the second operating state or an acceleration can result in the first operating state. It is also possible that based on an angle of a longitudinal axis of the drawbar 11 to the longitudinal axis A of the motor vehicle 1, the angle is taken into account in the triangulation determination of the evaluation device 10. This in particular also means that both an angular change of the longitudinal axis of the drawbar 11 to the longitudinal axis A can be or is taken into account in determination of the at least one geometric parameter H, B, L, R, F of the trailer 3, which can result in higher accuracy of this determination. It is also possible that the at least one geometric parameter H, B, L, R, F of the trailer 3 is determined only due to the angular change of the drawbar 11 with triangulation in the evaluation device 10.

FIG. 2 shows a schematic cross-section of the overrun brake 13 designated as a whole as the functional unit 9. The overrun brake 13 is disposed in a front area of the drawbar 11 of the trailer 3 with partial components, in particular with a tow bar and a reversing lever 15. The drawbar 11 in turn is connected to the motor vehicle 1 by the tow coupling 2. The overrun brake 13 includes a displaceable element 14, which is in particular the tow bar. If the motor vehicle 1 for example brakes or goes downhill, the tow bar retracts according to magnitude of the drawbar force and presses the reversing lever 15 of the overrun brake 13. It pulls a Bowden cable 17 via a brake linkage 16, which in turn is connected to a brake unit 18 of the trailer 3. The position of the tow coupling 2 and thus also the position of the coupling location between the tow coupling 2 and the coupling head of the drawbar 11 has remained the same and therefore has not changed with respect to the motor vehicle 1 in the two operating states of the functional unit 9.

FIG. 3 shows a schematic cross-sectional view of an embodiment. Therein, the motor vehicle 1 first has a camera 5, which can capture the environmental region 8 at least behind the motor vehicle 1. Therein, the camera 5 can also in particular capture the trailer 3. In FIG. 3, the two operating states of the functional unit 9 are indicated schematically and as possible examples. In the first operating state, the trailer 3 can have the first one characteristic location 12, 12', which can for example be formed by a front edge of a trailer construction. Furthermore, the functional unit 9 can have the position 19 or the geometric length of the relaxed state of the overrun brake 13 in the area of the drawbar 11 in the first operating state. In particular, the first operating state of the functional unit 9 and the location 12, 12' then characteristic at this point of time, in particular in positional relation to the camera 5 and thus also to the motor vehicle 1, is captured in a first image (for example FIG. 4). For example, in braking of the motor vehicle 1, which triggers the overrun brake 13, the trailer 3 moves towards the motor vehicle 1, since the point of the coupling of the trailer 3 at the tow coupling 2 does not displace, but approach of the trailer construction to the motor vehicle 1 is effected by the compression and thus the length shortening and thus the contraction of components of the overrun brake 13 in the area of the drawbar 11. Therefrom, it results a characteristic location 12' of the trailer 3 and a position 19' of the functional unit 9 in the area of the drawbar 11, in particular in positional relation to the camera 5 and thus also to the motor vehicle 1. This operating state is in particular captured in a second image (for example FIG. 5). For example, it can be achieved by means of the feature detection function that the characteristic locations 12 and 12' as well as the positions 19 and 19' of the functional unit 9 in the area of the drawbar 11 can be captured and evaluated by means of for example the one camera 5. The position 19 or the extension or the length of a partial area of the functional unit 9 disposed in the area of the drawbar 11 characterizes the first operating state of the functional unit 9. The position 19 can also be regarded in local relation to the stationary coupling location of the drawbar 11 to the tow coupling 2 and/or to the stationary camera 5. The position 19' or the extension or the length characterizes then correspondingly the second operating state of the functional unit 9. By means of the comparison of the first and the second image, an angle α can in particular also be determined for the first operating state and the second operating state, in particular for the positions 19 and 19'. In particular considering the angle α, a distance change ΔD of the position 19 and 19' can be determined. An angle β can also be determined from the captured images of the camera 5, which describes the difference of the characteristic location 12 in the first image and the characteristic location 12' in the second image. In particular, depending on the distance change ΔD, the angle α and the angle β, at least one geometric parameter H, B, L, R, F can be determined. For example, a distance of the characteristic location 12, 12' to the camera 5 can be determined. Thus, via the angle β, a geometric parameter H, B, L, R, F of the trailer 3 can be determined. In addition, an angular change between an angle of the longitudinal axis A of the motor vehicle 1 and the longitudinal axis of the trailer 3 can also be taken into account for this determination, which has then changed in the second operating state of the functional unit 9 compared to the first operating state. Additionally or instead, the angle between these longitudinal axes in the first operating state and/or the angle in the second operating state of the functional unit 9 can also be taken into account for this determination.

FIG. 4 exemplarily shows an image of the camera 5 with the trailer 3 in the first operating state of the functional unit 9. Therein, the camera 9 in particular captures the first image of the trailer 3 such that the functional unit 9 is in the first operating state, in particular in the relaxed state. Furthermore, the camera 5 can capture the position 19, 19' of a partial area of the functional unit 9 and the characteristic location 12 of the trailer 3 in particular by means of the feature detection. The position 19, 19' and/or the characteristic location 12, 12' are for example recognized by means of the feature detection. Thereto, an image area 20 can in particular be determined in the images, in which the position 19, 19' can for example be located or in which the position 19, 19' is to be expected. This image area 20, a so-called region of interest, is then searched at least for the position 19, 19', thus here for the at least first operating state of the functional unit 9. Hereto, edges, in particular color transitions, can be recognized or searched in the image.

FIG. 5 shows an image of the camera 5 with the trailer 3 in the second operating state. In particular, the functional unit 9 is in a tensioned state. Therein, the camera 5 has recognized the position 19' in the second image, which has displaced in a longitudinal direction towards the motor vehicle 1 with respect to the state shown in FIG. 4. The position 19' is also in the image area 20, whereby in particular the feature detection can have captured the displacement of the position 19 to the position 19'. Similarly, the characteristic location 12' of the trailer 3 can be recognized in particular via the feature detection. In particular, the position 19, 19' is at the displaceable element 14 of the overrun brake 13, which in turn is disposed at the drawbar 11 of the trailer 3. In the relaxed state, therein, the displaceable element 14 is positioned extended and the overrun brake 13 therein has a first extension length. In a tensioned state of the overrun brake 13, the displaceable element 14 is positioned retracted and the overrun brake 13 has a shortened second extension length different from the first extension length viewed in the direction of the longitudinal axis of the trailer 3. These extension lengths can be captured by means of the camera 5.

Based on the distance change ΔD of the position 19 in the first image to the position 19' in the second image, the displacement of the location 12 to the location 12' can now also be determined and at least one geometric parameter H, B, L, R, F can be determined based thereon. Here, the distance from the tow coupling 2 up to the characteristic location 12 can for example be determined as the geometric parameter H, B, L, R, F. Based on this determination, an at least two-dimensional, in particular a three-dimensional model, of the trailer 3 can be determined. This data can be coupled in the evaluation device 10 in particular to the driver assistance system 4 such that the driver assistance system 4, which can in particular have the navigation device, can calculate a travel route corresponding to the determined data of the vehicle/trailer combination 7. Thus, travel routes with narrow curves can for example be avoided such that the vehicle/trailer combination 7 can securely pass a travel route. It is also possible that for example underpasses with a certain height are avoided if the height of the trailer 3 should be calculated as larger than the underpass height.

By means of the method and the detection system 21, thus, it can be ensured that the motor vehicle driver can be provided with information or multiple information, in particular geometric parameters H, B, L, R, F of the trailer 3 in simple manner. The motor vehicle driver can resort to this information during the movement of the vehicle/trailer combination 7. Previous gauging of the trailer 3, which would in particular have to be manually performed, does not have to occur here. Thus, the method contributes to simplified and safe driving in the road traffic.

The motor vehicle 1 has the mentioned detection system 21, which includes at least one detector unit, in particular a camera 5, and an evaluation device 10, by which the information of the detector unit is evaluated and in particular an at least two-dimensional model of the trailer 3 is determined. The detection system 21 can also have multiple detector units for capturing the trailer 3, which can be of the same type or can be of different types. Thus, multiple cameras 5 can for example be present or a camera 5 and ultrasonic sensors and/or radar sensors and/or lidar sensors can be present. It can be provided that the operating state change of the functional unit 9, in particular of the partial area of the drawbar 11, is captured by a first detector unit, and the at least one characteristic location 12, 12' of the trailer 3 is captured by at least one other detector unit and/or multiple different characteristic locations 12 of the trailer 3 are captured by different detector units.

The invention claimed is:

1. A method for determining at least one geometric parameter of a trailer of a vehicle/trailer combination with a motor vehicle and the trailer, the method comprising:
    in a state of the trailer attached to the motor vehicle, capturing at least one characteristic location of the trailer in a first operating state of a functional unit of the trailer by at least one detector unit of the motor vehicle,
    in the state of the trailer attached to the motor vehicle, capturing at least the characteristic location of the trailer in a second operating state of the functional unit of the trailer different from the first operating state by the at least one detector unit of the motor vehicle; and
    depending on the information of the characteristic location obtained in both the first and second operating states of the functional unit, determining the geometric parameter of the trailer.

2. The method according to claim 1, wherein the first and the second operating state are recognized from two different images, which are captured by the at least one detector unit.

3. The method according to claim 1, wherein the characteristic location of the trailer and the first operating state of the functional unit are captured in a first image and the characteristic location of the trailer and the second operating state of the functional unit are captured in a second image.

4. The method according to claim 1, wherein a relaxed state of a functional unit formed as an overrun brake of the trailer is captured as the first operating state and a tensioned state of this overrun brake is captured as the second operating state.

5. The method according to claim 4, wherein
    a displaceable element of the overrun brake is disposed in a drawbar of the trailer, wherein the displaceable element is positioned extended in a relaxed state of the overrun brake and thereby a first extension length of the overrun brake viewed in the direction of a longitudinal axis of the trailer is generated in the area of the drawbar, and
    the displaceable element is positioned retracted in a tensioned state of the overrun brake, and thereby a second extension length of the overrun brake shortened with respect to the first extension length viewed in the direction of the longitudinal axis of the trailer is generated in the area of the drawbar, and the extension lengths are captured and the state of the overrun brake is recognized depending thereon.

6. The method according to claim 1, wherein a height, a length, a width, a tire number or a shape of the trailer or a parameter of a wheel of the trailer is determined as the geometric parameter of the trailer.

7. The method according to claim 1, wherein a plurality of geometric parameters of the trailer is determined and an at least 2-dimensional model of the trailer is created depending on the geometric parameters.

8. The method according to claim 1, wherein an angle of a longitudinal axis of the trailer to a longitudinal axis of the motor vehicle is captured in the respective capture of the operating state of the functional unit and at least one of these angles and/or an angular change are taken into account in the determination of the characteristic location in the respective captures of the operating states of the functional unit.

9. The method according to claim 1, wherein the at least one geometric parameter of the trailer is determined by triangulation considering the characteristic locations of the trailer in the respective operating states of the functional unit and/or the geometric positions of the functional units to the motor vehicle and/or to the characteristic location representing operating states of the functional unit.

10. The method according to claim 1, wherein the first and the second operating state and the information of the characteristic location are captured by a feature detection algorithm.

11. The method according to claim 1, wherein a further travel route of the vehicle/trailer combination to a destination is determined depending on the geometric parameter, in particular on the model of the trailer.

12. A detection system for determining a geometric parameter of a trailer of a vehicle/trailer combination, comprising:
   a motor vehicle; and
   the trailer including a detector unit capturing the trailer and determining the geometric parameter depending thereon,
   wherein the detector unit:
      captures at least one characteristic location of the trailer in a first operating state of a functional unit of the trailer in a state of the trailer attached to the motor vehicle,
      captures at least the characteristic location of the trailer in a second operating state of the functional unit of the trailer different from the first operating state in a state of the trailer attached to the motor vehicle, and
      determines the geometric parameter of the trailer depending on the information of the characteristic location of the trailer obtained in the two operating states of the functional unit.

13. A driver assistance system with a detection system according to claim 12.

14. A motor vehicle with a driver assistance system according to claim 13.

* * * * *